United States Patent Office 3,013,454
Patented Dec. 19, 1961

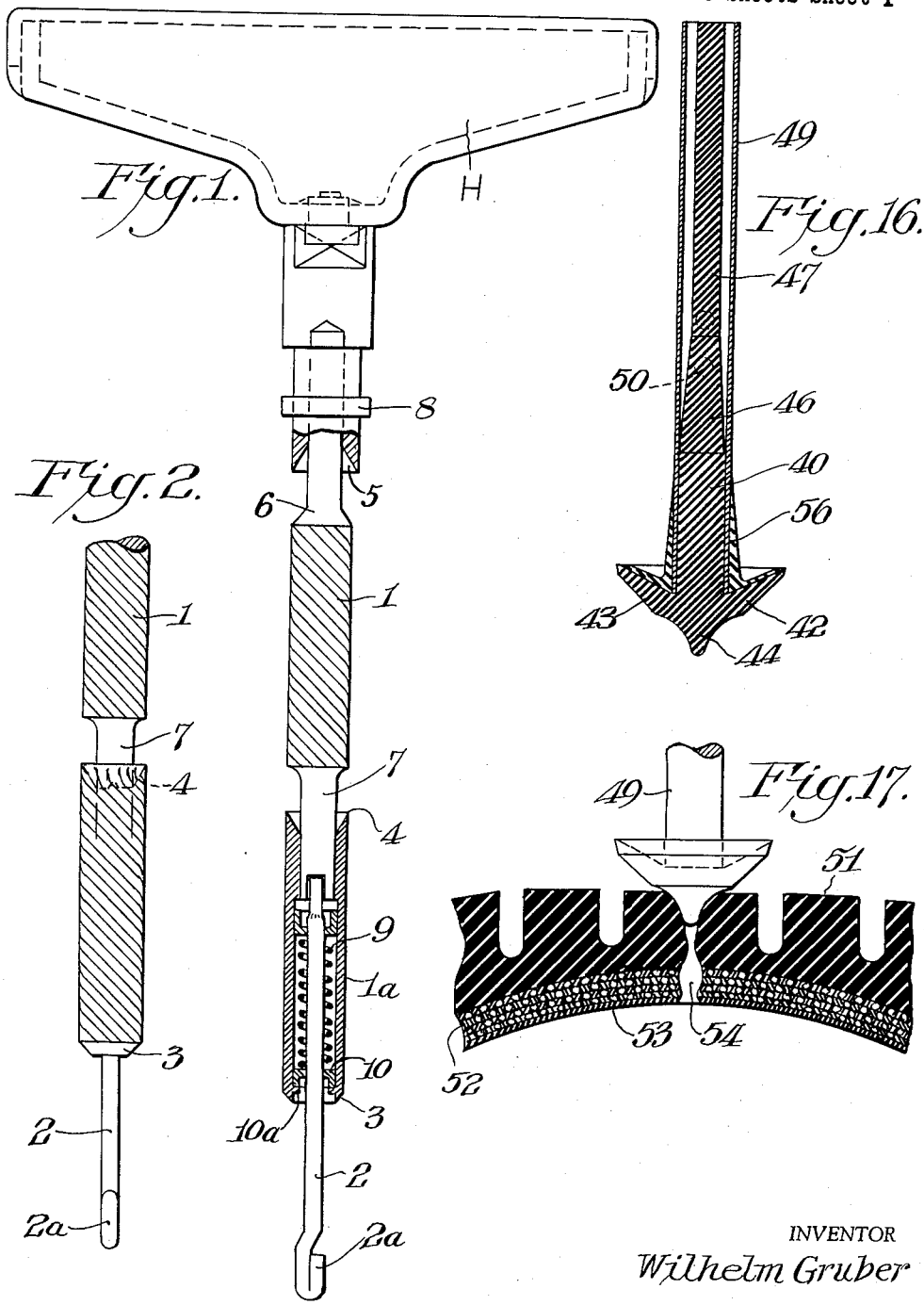

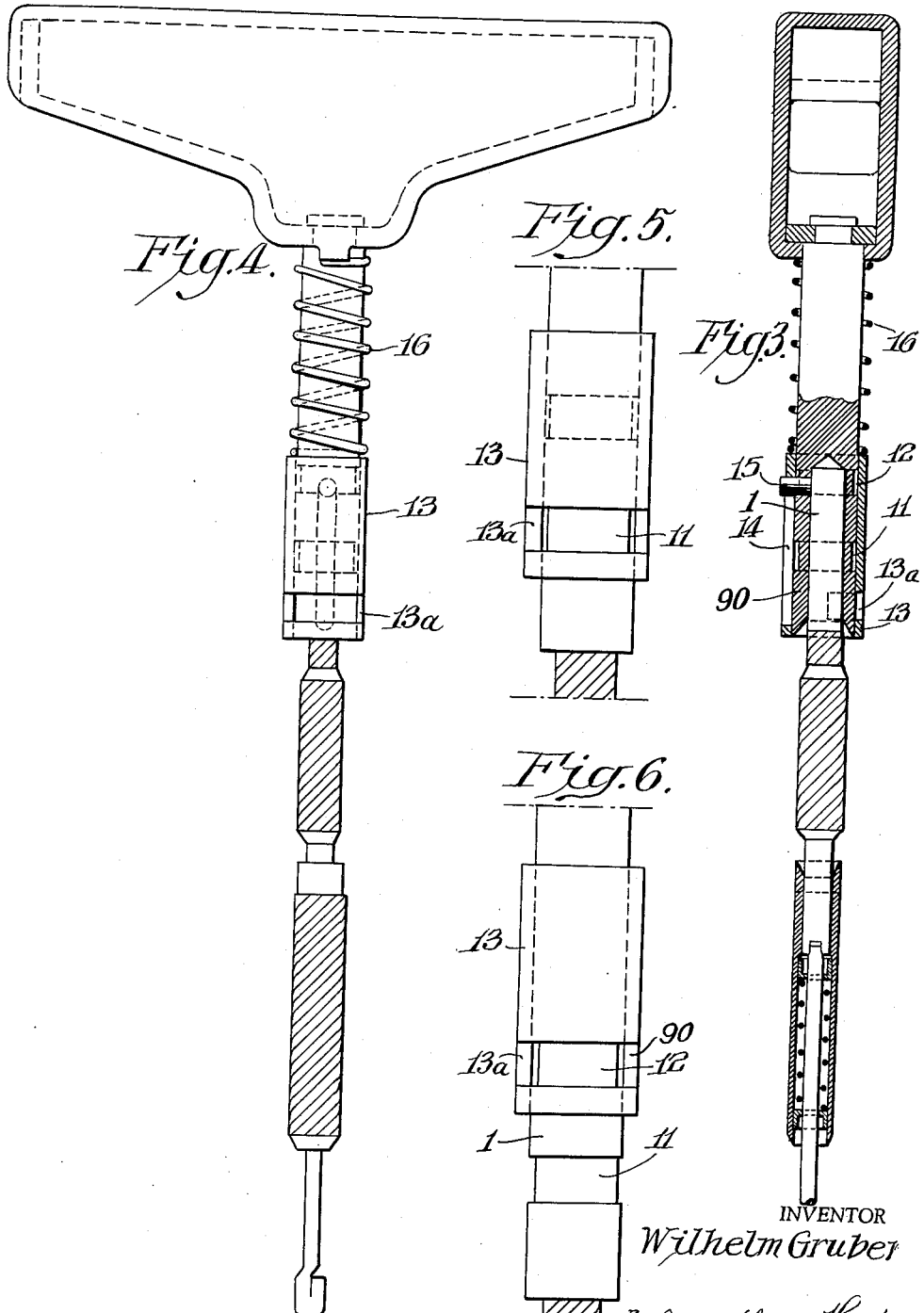

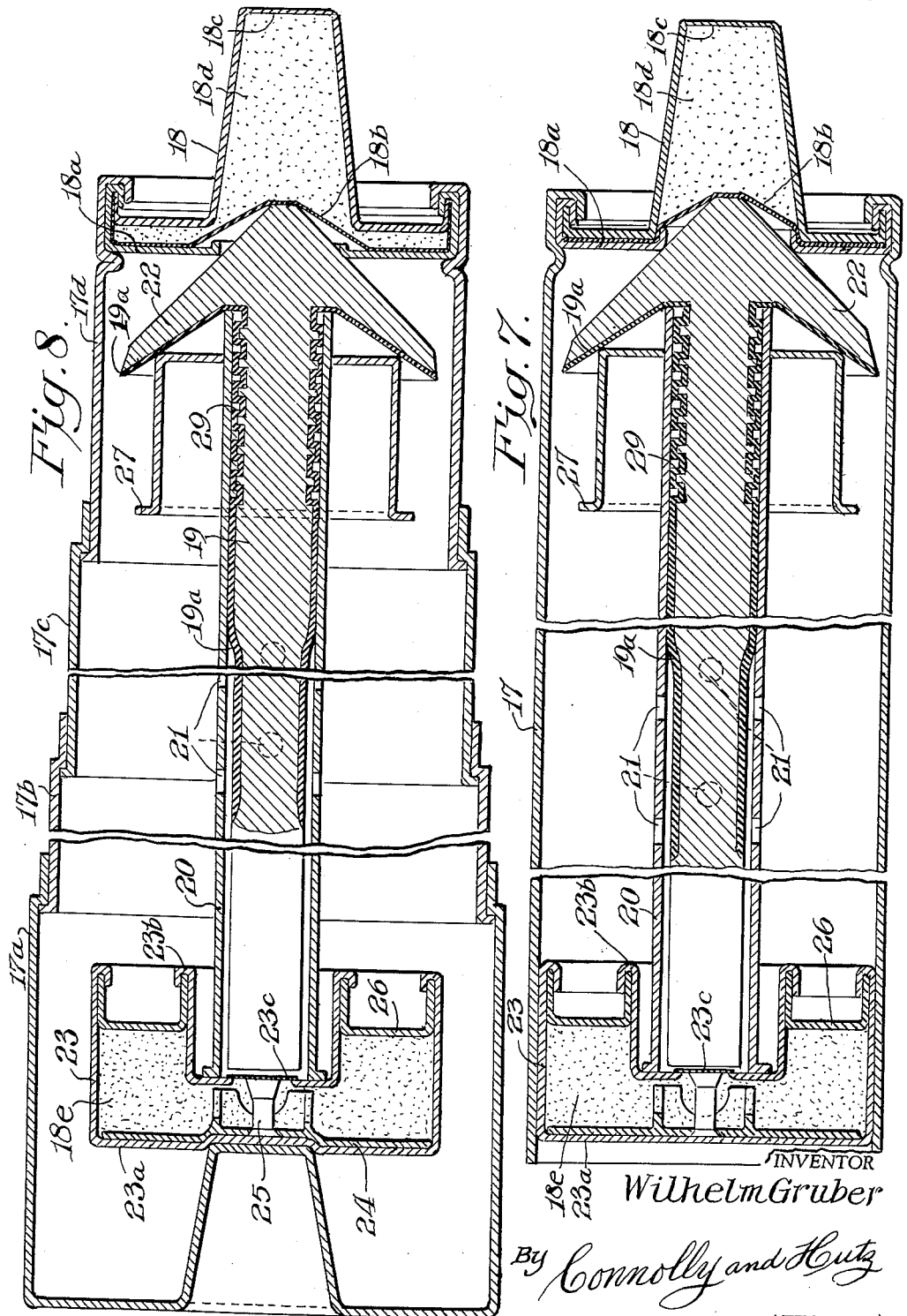

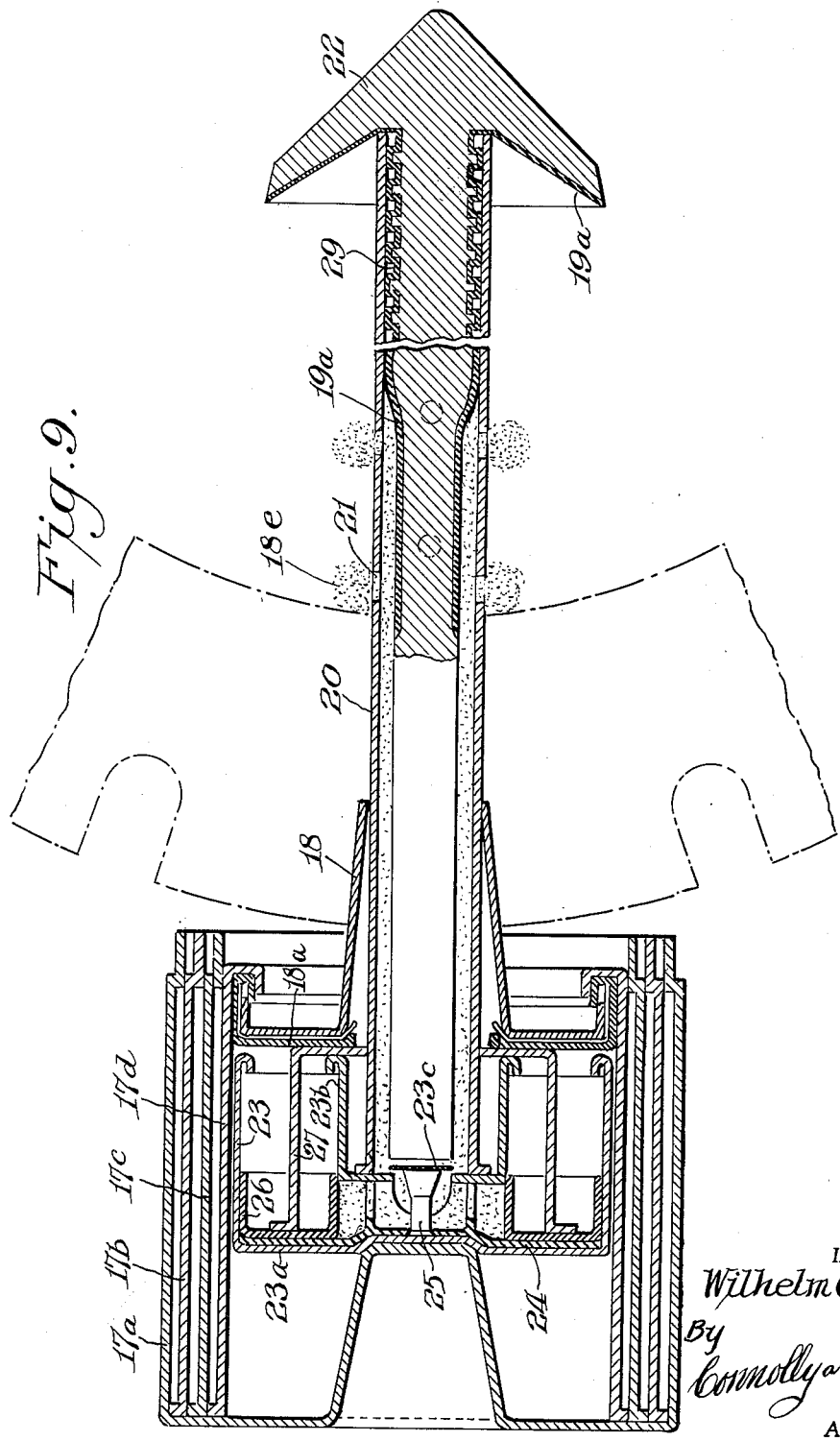

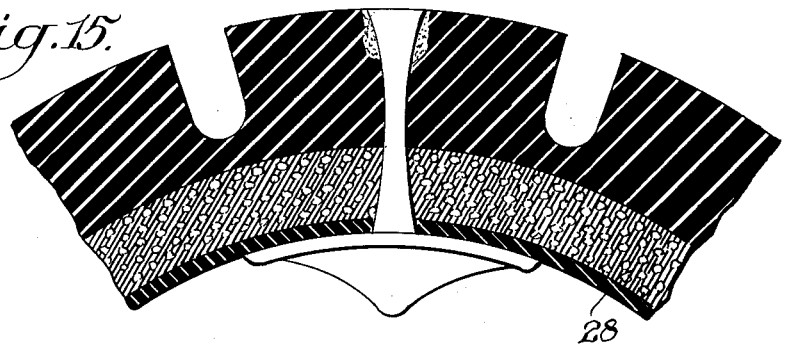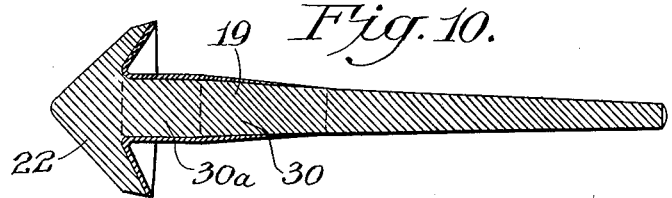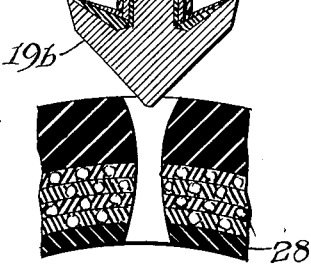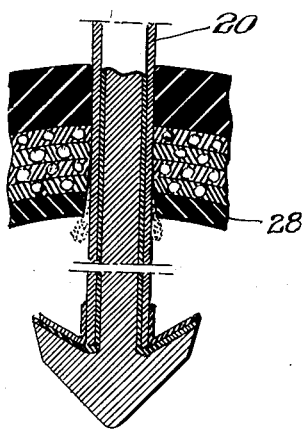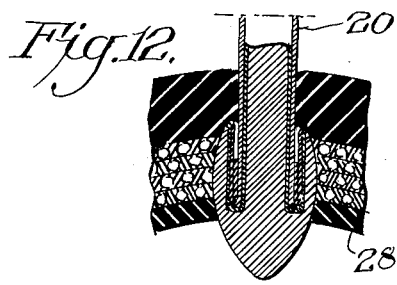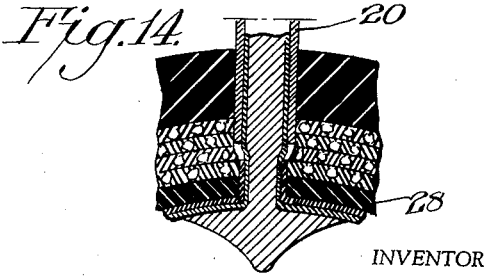

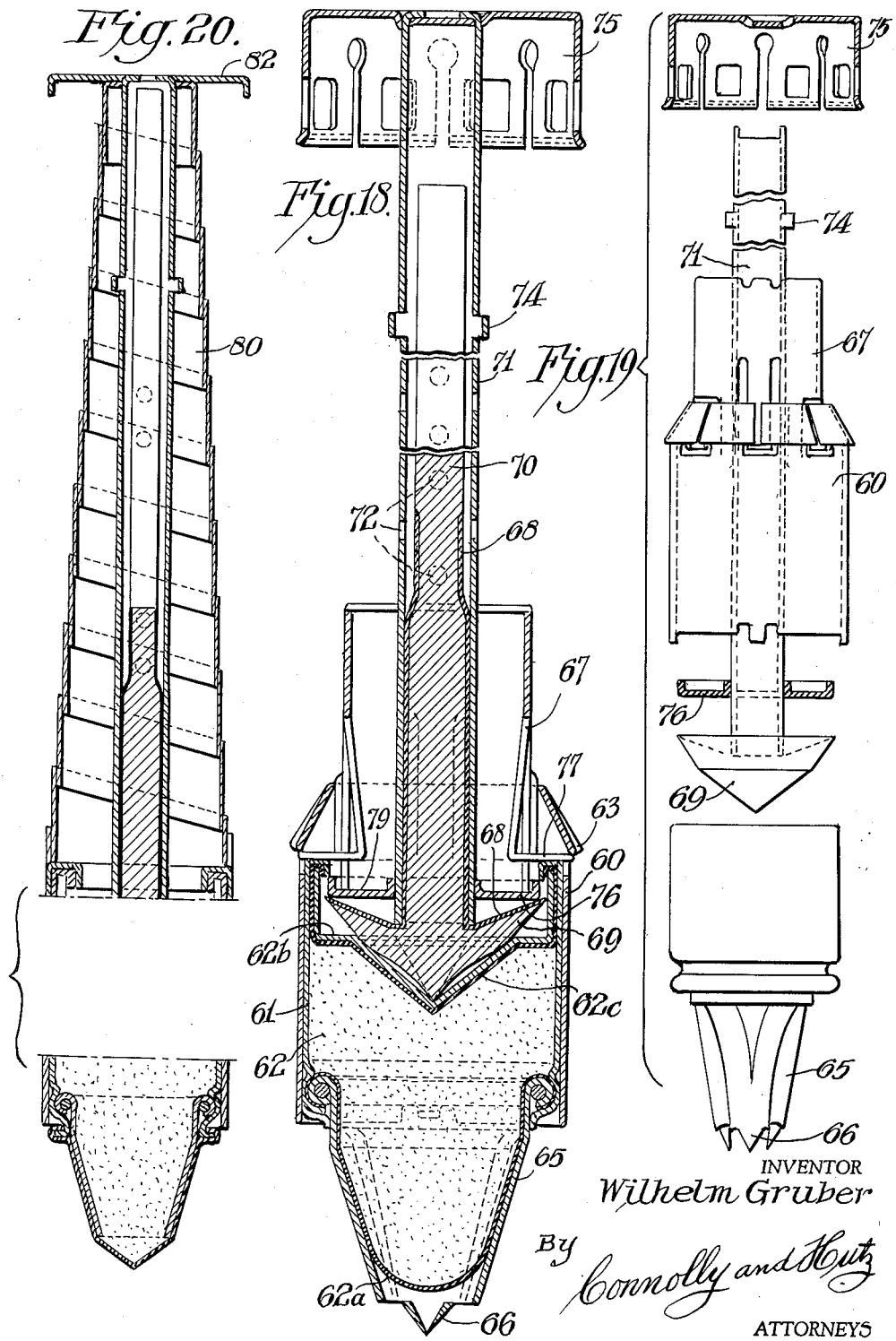

3,013,454
INSTRUMENT AND PLUG FOR REPAIRING
TUBELESS TIRES
Wilhelm Gruber, Mohlstrasse 2, Munich, Germany
Filed May 12, 1958, Ser. No. 734,482
Claims priority, application Germany May 15, 1957
7 Claims. (Cl. 81—15.7)

The removing and replacing of tubeless tires mounted on wheels endangers the joint between the bead of the tire and the wheel flange, particularly if the removal and replacement operations are not carried out carefully. Processes for repairing the tire on the rim of the wheel have accordingly been developed so as to make it unnecessary to remove the tire. The instructions used for such processes are not easy to understand or to follow exactly so that the repairs were often not carried out correctly or could not be made at all.

For filling in small puncture holes in the tire, corresponding quantities of hardening and vulcanizing rubber paste are pressed into the holes. When squeezing the paste into an open hole a large part of the paste enters downwardly into the empty tire chamber, and when pulling out the squeezing nozzle or other tool the closing of the hole wall drives a part of the pressed-in paste to the outside. A further part of the paste is squeezed out of the hole channel because of the squeezing operation which occurs during subsequent driving before a complete hardening or vulcanization can occur. Another prior art difficulty is that the inside wall of the hole made by a nail or the like can be coated with rust, oil or the like because of which it is more or less impossible for the rubber paste to properly engage the hole wall.

Also previously known are cylindrical plugs of pre-vulcanized rubber which can be clamped in the eye of an awl with whose aid they are then pulled into the hole. During this forcing in into the tight unprepared tire hole the cylindrical rubber plugs tend to tear at the awl. Furthermore, no punctures form a perfectly round cylindrical hole in the tire. In every case formation of cracks occurs. A pre-vulcanized rubber plug which is only moistened with rubber solution and which is pressed into the unprepared tire hole is a foreign body in the tire and cannot fill out the side cracks of the hole. The pressure of a pressed-in rubber body which has a Shore hardness of about 65 Shore is too much for the cushioning rubber and the connecting rubber coating of the tire which generally have a Shore hardness of about 40, and causes a further tearing of the cracks in the walls of the hole. Also, when forcing in the rubber plug, which usually has a turned over edge at the eye of the awl, a double diameter of rubber results (the diameter of the plug plus that of the turned over edge) so that in addition to the thick eye portion of the awl, a comparatively thick body is pressed into the unprepared tight hole, and the cracks in the hole walls rip farther. A durable and dependable sealing is accordingly not easily obtained with any of the prior art processes.

According to the present invention, a novel process for repairing tubeless tires on the rim of the tire has been developed. The process uses a repair body in the form of a pre-vulcanized rubber body having a hardness of about 40 Shore, which can be coated with a layer of unvulcanized rubber, and consists of a cylindrical shaft with a conically tapered section and at its wide portion has an umbrella-like head. Novel tools are also provided in accordance with the present invention, to simplify the insertion of the plug.

Furthermore, the process can use known vulcanizing pastes which can contain suitable vulcanizing accelerator combinations. The vulcanizing paste fills and closes all cracks which in given cases might be present in the hole walls. The vulcanization accelerators in the vulcanizing paste are of the low temperature kind and coact with the sulfur which is delivered from two sides, namely from the hole wall and from the unvulcanized connecting layer, under the concentrated pressure of the hole walls on the repair body, thus effecting vulcanization in the shortest time. Through this vulcanizing-in of a comparatively soft repair body, the same unites with the material of the tire and forms a permanent constituent of the same.

The process of the invention takes place best in the following working stages:

(1) Round cutting of the hole to prevent further cracking;

(2) Several times cleaning the hole by simultaneously finishing the calibration of the same to similarity of form and strength with the repair body;

(3) Introducing a quantity of vulcanizing paste into the prepared hole;

(4) Insertion in the prepared and paste-containing hole of a repair body, the shank of which is held in a cylindrical tube having several perforations at the reduced tail portion of the body;

(5) Squeezing of another quantity of vulcanizing paste through the tube and its perforations into the wall of the hole;

(6) Pulling the tube out from around the shank of the repair body;

(7) Drawing the repair body outwardly until the underside of its umbrella-like head lies against the tire's inside wall;

(8) Cutting off the protruding shank end of the repair body at the outer surface of the tire.

For carrying out this process tools are provided to make it possible for inexperienced individuals to properly carry out the whole process without using complicated instructions and even on the roadway. The repair can in this way be made with the usual air pressure or even under decreased air pressure in the tire.

The tools developed for carrying out this process include:

(a) A combined probe and calibrating tool: and
(b) An insertion tool for introducing the repair body and vulcanizing paste.

The invention will be more clearly understood by reference to the accompanying drawings which illustrate a few of its embodiments and wherein:

FIG. 1 is a front elevation partly in section, of puncture processing tool in accordance with the present invention;

FIG. 2 is a fragmentary side view of the tool of FIG. 1;

FIG. 3 is a vertical sectional view partly broken away and partly in elevation, of a modified form of tool similar to that of FIG. 1;

FIG. 4 is a front elevation of the tool of FIG. 3;

FIGS. 5 and 6 are detailed views showing steps in the use of the tool of FIGS. 3 and 4;

FIG. 7 is a longitudinal sectional view of a plug inserting tool pursuant to the present invention;

FIG. 8 is a similar view of a modified form of such tool;

FIG. 9 is a view similar to that of FIG. 8 showing the operation of that tool;

FIG. 10 is a longitudinal sectional view of a repair plug according to the present invention;

FIGS. 11, 12, 13, 14 and 15 show steps in the insertion of the repair plug;

FIG. 16 shows a modified form of repair plug held in a tubular holder;

FIG. 17 shows the modified plug of FIG. 16 in entering position against a tire casing;

FIG. 18 is a longitudinal section of a further form of tool representative of the present invention;

FIG. 19 is an exploded view showing some of the details of the tool of FIG. 18; and FIG. 20 is a fragmentary view showing an alternative construction for a tool such as that of FIG. 18.

One of the tools of the present invention has a generally cylindrical body whose upper end is set tightly into a handle while the lower (entering) end is hollow and has a ring-shaped cutting edge which houses a probe. In about the middle of the body there is arranged a tapering and upwardly directed second ring-shaped cutting edge, and close to the handle a further tapering and a third, downwardly directed, cutting edge. Above the latter there is a check ring of a larger diameter. The diameters of the three cutting edges are chosen in such a way that the diameter of the lower one is smaller, the diameter of the middle one is the same as, and the diameter of the upper check ring is larger than the largest diameter of the cylindrical body.

FIGS. 1 and 2 are views of the above type of tool. The cylindrical body 1 is inserted with its upper end, for example with the aid of screw threads, into the handle H, and has a lower extension 1a. The lower extension is hollow and in it there is stored axially the probe needle 2 with bent end 2a. At the body there are also provided two tapers 6 and 7 and the three ring-shaped cutting edges 3, 4 and 5. Above the uppermost cutting edge 5 is a ring-shaped stop 8 which has a larger diameter than the three cutting rings 3, 4 and 5. The diameter of the cutting edges of the rings 3, 4 and 5 are different, the diameter of the lower ring being a little bit smaller than the diameter of the body 1, and the diameter of the ring 5 being a little bigger than the diameter of the body.

In the inside of the lower hollow part 1a there is provided a spiral spring 9 and a cup 10 which is perforated in the middle. The spring 9 presses the cup 10 downward against a stop 10a at the inside wall of the extension in the immediate vicinity of the ring 3. The cup 10 can be pushed up along the probe needle 2 against the effect of spring 9. The cylindrical surfaces of the body are provided between the lower and the upper cutting edge, except for the tapered portions, with a milled edge or corrugation, best in screw (helical) form, to ease the insertion of the apparatus into the tire hole when the body is rotated around its longitudinal axis.

For use, the apparatus with bent end 2a of the probe needle 2 is inserted into the tire hole. The probe needle thereby serves as a feeler to accurately insert the apparatus into the hole. By noting from the positive travel of the probe needle that the apparatus is correctly placed in the hole channel, under uniform turning, the apparatus is inserted into the hole channel up to stop 8, so that first the ring 3 and then near the end of the inserting motion the ring 5 become effective. Ring 3 peels off the unevenness from the total length of the hole channel wall so that a thin, more or less unitary cylindrical layer is cut out of the tire mass. This layer first pushes itself against spring 9 into the inside of the hollow part 1a of the body 1.

In the last phase of the tool insertion, the upper ring 5 superimposes on the tread surface of the tire and cuts a cylindrical piece out of the same. When the apparatus is inserted to the stop 8 into the tire hole, the lower part of the same extends up to about the tapering 7 beyond the tire's inside wall and into the inside space.

Now the apparatus is screwed out of the tire hole by rotation in the opposite direction. Thereby first the wide shoulder at the lower end of the tapering 6 lifts out the rubber ring which was cut out of the tire tread surface by the upper cutting edge 5 in the last phase of inserting the apparatus. At the same time the cutting edge 4 which is directed upwardly becomes effective and cuts the hole somewhat wider from the inside to the outside. Thereby the hole channel is calibrated exactly cylindrically with a diameter which is a little smaller than the cut-out previously effected by ring 5 in the tread surface. After pulling the tool out of the hole channel, the hole has a diameter as indicated in FIG. 11. The spring 9 with the aid of cup 10 ejects the tire parts which are cut out by ring 3 to the outside so that the material can easily be removed from the apparatus. The tire material cut out by cutting edges 4 and 5 now lie on the outside surface of the body and can also be easily removed. The apparatus can accordingly be used again at once.

FIGS. 3–6 show a modified form of one of the devices of the invention. Here the main body portions 1, 90 are formed with two cylindrical taperings or grooves 11 and 12, which are indicated by contrasting colors, for example red and green or yellow and blue. The grooves are shown in the main body 90 on which is also resiliently mounted a casing 13 which has a window 13a about the same longitudinal height as the grooves 11 and 12. A longitudinal lead shot 14 in the casing 13 engages a lead pin 15 which is rigidly affixed to part 8. Casing 13 is urged outwardly (downwardly) by means of a spring 16, and when the tool is used, is displaced upwardly along the main body against the effect of spring 16.

The above-described construction makes an especially suitable use of the apparatus possible. For example, it might be assumed that the lower groove 11 is marked red and the upper groove 12 green. When the hole in the tire to be repaired lies in the upper edge of the tire profile, then one drills with the device as described so far, until the red marking of groove 11 is visible in its full width in window 13a; if the hole to be repaired lies in the depth of the profile, then one drills with the device until the green marking is visible in its full width in window 13a. As soon as the suitable marking shows in window 13a, the device is moved out of the tire in the above-mentioned way.

The diameter of the calibration apparatus can be chosen to correspond to the size of the tire hole to be repaired. It is best to have a variety of calibration devices of different diameters in order to have the right device at hand in order to match the tire hole to be repaired.

FIGS. 7 and 8 show forms of the apparatus to insert repair bodies and vulcanizing pastes. In FIG. 7 an outside holder is in the form of a one-piece cylinder, whereas in FIG. 8 the holder is constructed of several telescopic cylindrical sections. The internal arrangements of the two apparatuses are essentially the same.

Into one end of the cylindrical holder 17 or 17a, 17b, 17c, 17d, a conical nozzle 18 is fastened with a wide cylindrical base plate 18a which, in the construction of FIG. 8, is arranged to move axially under the effect of pressure. In any case, the nozzle 18 is closed at the top with a lid 18b and at the bottom with a lid 18c which both consist of material such as metal foil which can easily be pushed through. The inside of the nozzle is filled with vulcanizing paste 18d so that it is a sealed container for a measured amount of vulcanizing paste.

The repair body with the vulcanized core 19, the unvulcanized rubber coat 19a, and the umbrella-like head 22, is arranged within a tube 20 which surrounds its shank and has openings 21, so that the repair body head rests in an axial opening in the plate 18a, while its shank or tail end rests in a socket of a container 23 that holds a second quantity of vulcanizing paste 18e. The container 23 is a relatively flat cylinder which has its outer face securely closed at 23a, while on the other face it is covered by a bowl-shaped body 23b which can be moved a little axially under pressure and which has a frangible center 23c. Around the bowl-shaped body 23b is a ring lid 26 which under pressure can also be moved in an axial direction. In the inside of the container 23 there is a loose insert 24 which carries in the center a pin 25 with a head which is slightly widened. The pin serves for pushing through the above mentioned frangible center 23c.

The opening and emptying of container 23 is actuated by the axially perforated cup 27 which sits slidingly on tube 20 and which, when pushing together the elements within the holder 17, pushes against ring 26 of container 23 and moves the same axially so far that the pin 25 pushes through the frangible wall 23c and the vulcanizing paste 18e is squeezed through the opening made at 23c into the inside of tube 20 around the repair body.

The pushing together of the described apparatus takes place in the case of FIG. 7 by means of some suitable plunger (not represented) which has a little bit smaller diameter compared with the cylinder and is placed against the flat end 23a of the container 23. Under the effect of this pressure the elements arranged in the inside push in the direction of nozzle 18 and the following things take place in sequence: The opening and emptying of the first container (nozzle) of vulcanizing paste; the squeezing of the paste into the still empty calibrated hole; the pressing of the repair body into the hole; the opening and emptying of the second container for vulcanizing paste; and the after-pressing of this amount of vulcanizing paste into the space between the repair body and the hole wall.

In the case of an apparatus of the type of FIG. 8, these operations occur with the pressing together of the telescope housing in the same sequence. When pulling out the telescope cylinder after the insertion operation is completed, the tube which surrounds the shaft of the repair body is pulled out and the repair body is pulled back until the underside of its umbrella-like head engages the tire's inside wall. After disengaging the apparatus from the tire the only thing remaining to be done is to cut off the extending free end of the repair body shank flush with the tire tread.

FIG. 9 shows the apparatus of FIG. 8 with the telescopic housing squeezed together, and also shows the tire that is being repaired.

As illustrated in FIGS. 7, 8 and 9, the repair body can have its shank provided with one or more shallow circular grooves 29 adjacent its head. These help the shank stretch to fit the repair hole better, and also act as pockets for vulcanizing paste thereby improving the vulcanizing action.

FIG. 10 shows a repair body which has a tapered shank section 30 and has a maximum diameter of about 6.3 mm. This can be pulled into a metal tube 20 (FIGS. 7, 8 and 9) about 5 mm. in inside diameter, which this shank fills from end to end. When inserting the repair body into the tire hole there is only the outside diameter of the metal tube plus the material thickness of the thin umbrella head 22 (FIG. 12) which lies close to the shank and which when inserted through the hole channel, stretches considerably and elastically and therewith decreases its thickness. When pulling tube 20 back, umbrella 22, which is freed on the inside of the tire (FIG. 13) acts as a stop and sucks in on the inside wall of the tire (FIG. 14). When pulling out tube 20, the cylindrical shank section 30a becomes uncovered, and then the conical part 30 extends out beyond the repair hole whose walls, previously covered with vulcanizing paste, are now sealed. Through pulling at the thin extension of the repair body which extends from the hole and which is therefore more elastic, a narrowing of the repair body is effected and inasmuch as the body is strongly pressed into the hole, its further narrowing is no longer possible.

The repair body has an umbrella-like head 22 of the type of a half opened umbrella, and also has a tip. This form eases the insertion of the repair body.

FIGS. 7 through 10 show a lamellar construction of the sealing zone 30 of the repair body. This construction makes it possible to pull the repair body of larger diameter into a tube with a smaller diameter and to store the same without shrinkage for a limited time. Also, the underside of the umbrella head and the outside of the sealing zone 30 is coated with a jointing layer of unvulcanized rubber which advantageously should contain sulfur.

With the foregoing working methods, the vulcanizing paste is preferably lubricating. Solvents and softening agents are added to the paste for this purpose. When inserting the repair body into the tire hole, the rubber umbrella squeezes off a good part of the paste previously pressed out in the hole channel and the rubbed off paste is carried into the tire on the tip of the rubber umbrella, where it remains on the inside of the tire.

A major part of the paste pressed out through the perforations 21 of the sheet metal tube 20 emerges into the hollow interior of the tire, between the underside of the umbrella and the inside wall of the tire. When the sheet metal casing is pulled out of the tire some of the vulcanizing paste will remain. When the sheet metal tube is pulled out of the tire the umbrella of the plug lies against the inside wall of the tire. When this part of the repair body is pressed against the inside of the tire wall the paste is squeezed around the repair body and a quantity of paste adheres to the sheet metal tube. This quantity is scrubbed off into the hole when the tube is withdrawn from the tire. Underneath the umbrella, i.e. between the umbrella and the tire inside wall, only comparatively little vulcanizing paste remains. Some of the paste clings to the tube 20. This squeezes off at the inner end of the hole through the tire when the tube is pulled out. The squeezed-off paste is pulled into the hole but under certain circumstances is not sufficient. At the same time there is insufficient vulcanizing paste between the unvulcanized connecting layer and the shank sections 30, 30a.

FIG. 11 shows a repair body 19 which is pulled into a sheet metal tube 20. The inside of the umbrella portion 22 is covered with a thin connecting layer 19a of unvulcanized rubber which can contain sulfur and/or accelerators (catalysts), and is wedge-shaped in radial section. During the insertion of the repair body into the tight hole, this sticky, kneadable, but solvent-free strong, tough rubber mass is pressed against the sheet metal tube by the umbrella (FIG. 12). When pulling or drawing the casing 20 out of the puncture the layer 19a first clinging to the casings' outer surface and becoming superficially slippery by the action of the solvent of the after-pressed vulcanizing paste, peels off from the casing 20 as it emerges from the puncture, is shifted towards the casing's lower end and at last left behind in the puncture hole, which thus is more fully filled out. The outward pulling of the tube first causes the umbrella to engage the tire's inside wall and the resistance thus created causes the further pulling to stretch out the cylindrical shank part 30a which thereby becomes thinner and a small chamber results in the hole wall. The tough, solvent-free, unvulcanized rubber mass cannot escape quickly enough during the quick pulling of the umbrella toward the inside wall and therefore becomes squeezed into this chamber, along with some of the after-pressed vulcanizing paste.

In the working method indicated in FIGS. 11–14 there is a more uniform introduction of vulcanizing paste between the hole wall and repair body and also between the rubber umbrella and the tire's inside wall.

FIGS. 16 and 17 illustrate another embodiment of the repair body which is easier to insert into the tire hole. As shown, the cylindrical stem 40 of the repair body is closed at one end by an umbrella-like head 42 which consists of a truncated cone-shaped part 43 and a tip 44 concavely-curved to taper out to part 43. The truncated cone part is deepened at its underside so that a more abruptly tapering wall is formed. By reason of this shape a preferred form of which is shown exactly to scale (1:1) in FIG. 16, the plug head penetrates more readily into the puncture hole.

As in the constructions of FIGS. 7, 8 and 9, the shank of the repair body tapers down over a truncated cone-shaped part 46 into a cylindrical part 47 of a smaller diameter. This is also helpful inasmuch as the tubular casing 49 for the repair body closely engages only the thicker part of the repair body shank while the upper parts 46 and 47 sit very loosely inside it. Vulcanizing paste can therefore be pressed from above between the inside wall of casing 49 and the outside portions 46, 47 of the repair body, and can be drawn through the lateral openings 50 in casing 49 to the wall of the tire hole. The casing can be made of metal or other material such as plastic.

The repair body of the invention consists essentially of vulcanized rubber with about 40 to 60° Shore hardness to match that of the tire. In the preferred design, the vulcanized rubber is coated with a thin coat of unvulcanized rubber which covers at least the total effective outside surface of the repair body with the exception of the outside of the head. If the so-constructed sealing body contains when it is inserted into the tire hole a solvent-poor vulcanizing paste, rubber filling agents and a mixture of vulcanization accelerators and ultra accelerators, and it is pressed in place, then the heat generated by the action of the running tire quickly completes the vulcanization of the repair body in the tire hole. As a result, the repair body over the total range of its shank is solidly welded to the outer tire rubber 51, the rubberized cord portion 52 and the inner rubber layer 53 inside the tire hole 54.

It is preferred that so much vulcanization paste is inserted in the hole that it covers also the inside of the umbrella-like head and produces a vulcanizing connection at this location. Good formulation for the solvent-free vulcanizing paste consists of:

100 parts by weight of pale crepe rubber
40 to 80 parts by weight of chalk
1.5 to 15 parts by weight of zinc white-red seal
0.5 to 2.0 parts by weight of sulfur flowers
1.5 to 6.0 parts by weight of depolymerized rubber The ingredients are milled till uniformly mixed, and the mixture applied as by extruding it into the desired tubular shape and slipping it in place. Where solvents or lubricants are used, benzol or other similar liquid are suitable.

It is preferred that the repair body be fitted to a calibrated hole in such a way that the repair body maximum shank diameter is about twice or three times that of the calibrated tire hole which it is to seal. The elasticity of the soft rubber of which the repair body consists, allows this diameter to be squeezed down when inserted into the tire casing, and into the tire hole. After removing the inserting apparatus the body seals itself over its entire inside surface.

FIG. 18 shows in cross-section a further modified tool. It consists of a casing 60 which accommodates a shell 61 filled with vulcanizing paste 62, the shell being closed air tight by an easily torn sheet 62a at its bottom and at its top by a head 62b which has a cup-shaped radially slit central portion. A sheet 62c is arranged over this and can be easily torn apart. At the lower end of the casing 60 there is a conical nozzle 65 of easily stretchable material, the nozzle having longitudinal folds extending from top to bottom (see FIG. 19), and is provided with grip tips 66. On the upper rim of the shell 61 there is a guide tube 67 which helps support a tubular plug holder 71. A repair body of vulcanized rubber 68 and having an umbrella-layer of vulcanizable material 68 and having an umbrella-like head 69 with a shank 70 held in cylindrical holder 71 having perforations 72 and protruding tongues 74, is supported in such a way that the umbrella head rests in a cup-shaped portion of the head 62b. The tube 71 is covered at its top by a springy grip cap 75 held by lips or tabs extending from the top edge of tube 71. Inside of casing 60 there is loosely arranged above the umbrella head 69 of the sealing body concentrically around the tube 71, a plate disc 76.

The guide tube 67 is cylindrical and is provided at its upper end with internally bent detents to guide against the wall of tube 71. These detents are spaced sufficiently to allow the passage of the tongues 74 therebetween. The lateral wall of the guide tube 67 is slit several times to form three small holding arms 77 whose ends are bent outwardly and lie on the upper rim of shell 61. Between these arms 77, cylindrical segments 79 protruding below the arms, center themselves in the border of the shell. The lower end of the guide tube 67 presses on the plate disc 76. As the device collapses the tongues 74 of the holder 71 are brought in contact with the plate disc 76, so that the latter is pressed downwards squeezing out the second portion of the vulcanizing paste.

One inserts the apparatus with the tip of nozzle 65 into the outer opening of the previously calibrated tire hole. Thereby the grip tips 66 of the nozzle anchor in the rubber of the tire tread. Now one presses, always in the direction of the axis of the tire hole, with one's hand on the upper surface of the grip cap 75, i.e. one presses the tube 71 surrounding the repair body into the shell 61 with the umbrella head 69 leading. Thereby the umbrella head first rips the upper sheet 62b and presses its radially slit segments so far apart that the umbrella head with its rim folded back on the shank can enter into the inside of the shell. During this process through which the inside space of the shell is considerably decreased with the advancing of the repair body, the pressure in the shell bursts open the lower closing sheet 62a of the shell and enters through nozzle 65 into the tire hole. This is the first phase of the pressing during which the first portion of the vulcanizing paste is pressed into the still open tire hole.

Under the continued axial pressure on grip cap 75, the repair body with tube 71 is moved farther downward, finally arriving in the conical nozzle 65 and through its opening is sunk into the inside of the tire hole.

During this process of the axial downward pushing of tube 71, tongues 74 of the tube move inward toward plate disc 76 and press the same downward on the ripped-open upper surface of the shell which is, because of this, closed again. When further moving the grip cap 75 down, the same hits the upper rim of the cylindrical guide tube 67 and presses the same down so far that it, by means of the plate disc 76, bears against the sheet 62b and through this pushes out another portion of the vulcanizing paste which is in the shell. In this phase the perforations 72 of tube 71 are the only exit for the paste which therefore enters into the inside of the tube and fills out the inside wall of the tube and emerges again through the above holes into the inside of the tire hole.

The length of the apparatus is measured in such a way that, after the grip cap 75 has reached its lowest position, the repair body with tube 71 is inserted so far through the tire hole that the rim of the umbrella-like head has emerged into the inside of the tire and has therefore unfolded, so that it is larger than the inside tire hole and holds the repair body like a wide rivet head.

Now the device with the tube 71 has to be pulled out of the tire hole. For this purpose the grip cap 75 is resilient in such a way that it pushes around casing 60 and locks over cams 63 formed on its outer edge. If after this locking the grip cap 75 is pulled upwardly, first the underside of the umbrella-head 69 is pulled tightly against the inside wall of the tire, and seals the inside opening of the tire hole which is already filled by the shaft of the repair body. When further moving the grip cap outwardly, tube 71 glides off from the shaft of the repair body which is anchored in the tire hole by the umbrella-head, and only leaves between hole wall and shaft circumference the after-pressed vulcanizing paste which entered through perforations 72 of the tube. At the same time, the casing 60 takes with it the guiding tube 67 and the plate disc 76 together with the empty punctured shell 61, so that with this one-step pulling-out, the repair site is completely cleaned of apparatus.

Basically it is possible to fill the apparatus anew with a shell and a repair body and to prepare the same for second use. But with the cheapness of its production it is feasible to throw the same away after one use.

FIG. 20 shows two variations of the described design and represents a different construction of the conical nozzle and of the inserted shell for vulcanizing paste. Here the nozzle is locked to the shell in such a way that the frangible sheet at the bottom is laid over the outside wall of the side.

According to FIG. 20 the grip cap is also replaced by a telescope-like movable tube 80 with a grip plate 82 which closes the top. This tube is on the upper side of the shell 61 and replaces the separate parts that include the guiding tube 67 and grip cap 75 of the construction according to FIG. 18.

Obviously many modifications and variations of the present invention are possible in the light of the above teachings. It is, therefore, to be understood that within the scope of the appended claims the invention may be practiced otherwise than as specifically described.

What is claimed is:

1. A tool for inserting headed repair plugs in a tire casing, said tool having an elongated tubular holder for the plug, an enlarged nozzle slidably mounted at the end of the holder at which the head end of the plug is located, the opposite end of the holder being shaped to receive the application of manual pressure to push the holder through the nozzle and forcing the head ends of the holder and plug into the casing, and cooperating catch mechanism on the nozzle and holder to cause these members to become hooked together when the insertion is effected so that withdrawal of the holder from the tire casing in which the plug is fully inserted causes the nozzle to also be withdrawn.

2. The combination of claim 1 in which the tubular holder is positioned within a longitudinally collapsible tubular housing.

3. In a tire repair tool comprising an elongated tubular holder for insertion in a hole in a tire casing, a plug held by said holder, a head on said plug, a shank on said plug, a portion of said shank removed from said head tapering down to a reduced diameter, said reduced diameter extending to the tail of the shank, the holder adapted to snugly engage the shank near the head and spaced radially away from the reduced shank portion, storage structure associated with the holder for holding vulcanizing paste, a frangible sealing member in the storage structure for containing the paste indefinitely while being connected for squeezing the paste into the tire casing hole when the holder is forced into the hole to insert the plug and perforations in the holder in the radially spaced section.

4. In a tire repair tool comprising an elongated tubular holder for insertion in a hole in a tire casing, a plug for filling said hole and supportable in said holder, a storage structure associated with said holder for holding vulcanizing paste, a frangible sealing member in the storage structure for containing the paste indefinitely while being connected for squeezing the paste into the hole when the holder is forced into the hole to insert the plug, and a thin layer of vulcanizable rubber supported by the plug adjacent the entering end of the holder and in contact with the holder to be drawn into the tire casing hole upon withdrawal of the holder from the hole and then to part from the holder.

5. A tool for inserting rubber plugs having foldable heads into tire casing holes, the tool having an elongated tubular holder for the plug, a plug guiding nozzle containing vulcanizing paste having tubular ends covered by frangible seals, the frangible seal at the inner end of the nozzle being of reduced diameter to guide the plug through the nozzle while holding its head folded in to keep from sweeping all the paste before it, and the nozzle including yieldable wall structure that squeezes residual paste out of the nozzle when the holder is forced into the tire casing far enough to completely insert the plug.

6. In a tire repair tool comprising an elongated tubular holder for insertion in a hole in a tire casing, perforations in a region of said holder, a plug for filling said hole and supportable in said holder, a shank of said plug in said holder having portions of larger and smaller diameter, the portion of larger diameter of the plug shank being snugly engaged between the end portion of the holder and the smaller diameter portion of the shank being located in the region of the perforations in the holder, a storage structure associated with said holder for holding vulcanizing paste, a frangible sealing member in the storage structure for containing the paste indefinitely while being connected for squeezing the paste into the hole when the holder is forced into the hole to insert the plug, and a thin layer of vulcanizable rubber supported by the plug adjacent the entering end of the holder and in contact with the holder to be drawn into the tire casing hole upon withdrawal of the holder from the hole and then to part from the holder.

7. A tool for inserting rubber plugs in tire casing holes, including an elongated tubular holder adapted to receive and hold the plug, two storage structures for holding vulcanizing paste, each storage structure being closed by a respective frangible sealing member, one storage structure being disposed beneath the head of said plug and the other storage structure being disposed above the opposite end of said plug, a housing formed of telescopic and longitudinally collapsible sections, said housing being attached at one end to one end of said holder and a reduced plug guiding nozzle at the other end of the housing and in alignment with said holder.

References Cited in the file of this patent

UNITED STATES PATENTS

| | | |
|---|---|---|
| 555,235 | Durant | Feb. 25, 1896 |
| 573,049 | Syme | Dec. 15, 1896 |
| 583,438 | Hatch | May 25, 1897 |
| 607,379 | Jones | July 12, 1898 |
| 864,226 | Blodgett | Aug. 27, 1907 |
| 1,597,945 | Young | Aug. 31, 1926 |
| 1,778,686 | Plummer | Oct. 14, 1930 |
| 2,198,564 | Robison | Apr. 23, 1940 |
| 2,293,374 | Wesseler | Aug. 18, 1942 |
| 2,421,711 | Moots et al. | June 3, 1947 |
| 2,638,961 | Everett | May 19, 1953 |
| 2,727,554 | Westfall | Dec. 20, 1955 |
| 2,804,792 | Westfall | Sept. 3, 1957 |
| 2,828,657 | Fromberg | Apr. 1, 1958 |

FOREIGN PATENTS

| | | |
|---|---|---|
| 725,829 | France | May 18, 1932 |